United States Patent
Muttik et al.

(10) Patent No.: US 10,588,005 B2
(45) Date of Patent: Mar. 10, 2020

(54) FUZZY FINGERPRINTING OF COMMUNICATING WEARABLES

(71) Applicant: McAfee, LLC, Santa Clara, CA (US)

(72) Inventors: Igor Muttik, Berkhamsted (GB); Martin Stecher, Paderborn (DE)

(73) Assignee: McAfee, LLC, Santa Clara, CA (US)

( * ) Notice: Subject to any disclaimer, the term of this patent is extended or adjusted under 35 U.S.C. 154(b) by 274 days.

(21) Appl. No.: 14/498,287

(22) Filed: Sep. 26, 2014

(65) Prior Publication Data

US 2016/0094974 A1    Mar. 31, 2016

(51) Int. Cl.
| | |
|---|---|
| *H04W 8/00* | (2009.01) |
| *H04W 4/80* | (2018.01) |
| *H04W 12/06* | (2009.01) |
| *H04W 4/02* | (2018.01) |
| *H04W 12/00* | (2009.01) |
| *G06F 21/35* | (2013.01) |
| *H04B 13/00* | (2006.01) |

(52) U.S. Cl.
CPC ............ *H04W 8/005* (2013.01); *G06F 21/35* (2013.01); *H04B 13/005* (2013.01); *H04W 4/023* (2013.01); *H04W 4/80* (2018.02); *H04W 12/06* (2013.01); *H04W 12/00503* (2019.01)

(58) Field of Classification Search
CPC combination set(s) only.
See application file for complete search history.

(56) References Cited

U.S. PATENT DOCUMENTS

| | | | |
|---|---|---|---|
| 8,321,672 B2 * | 11/2012 | Asano | H04L 9/3273 |
| | | | 713/156 |
| 8,509,688 B2 | 8/2013 | Rajagopal et al. | |
| 8,705,387 B2 | 4/2014 | Falck et al. | |
| 9,159,223 B2 * | 10/2015 | Proud | H02J 7/025 |

(Continued)

FOREIGN PATENT DOCUMENTS

| | | |
|---|---|---|
| CN | 202077198 | 12/2011 |
| CN | 103477604 | 12/2013 |

(Continued)

OTHER PUBLICATIONS

European Patent Office, "Supplementary European Search Report," issued in connection with European Application No. 15844019.8, dated Apr. 26, 2018, 8 pages.

(Continued)

*Primary Examiner* — Yee F Lam
(74) *Attorney, Agent, or Firm* — Hanley, Flight & Zimmerman, LLC

(57) ABSTRACT

A collection of wearable communicating devices generates signals that may be detected and analyzed to produce a fingerprint of the collection of wearable devices. An analysis unit may recognize patterns or other information in detected signals and generate a fingerprint of a body area network corresponding to the collection of wearable devices. The fingerprint may be fuzzy fingerprint, matchable with a fingerprint of a similar, but not necessarily identical, collection of wearable devices that has been previously generated or obtained. The fingerprint may be used for tracking or other purposes. Some embodiments may allow the generation of additional signals that modify the fingerprint.

20 Claims, 7 Drawing Sheets

(56) References Cited

U.S. PATENT DOCUMENTS

| | | | |
|---|---|---|---|
| 2005/0245839 A1* | 11/2005 | Stivoric | G06F 19/3418 600/549 |
| 2007/0016790 A1* | 1/2007 | Brundage | G06T 1/0071 713/176 |
| 2008/0149713 A1* | 6/2008 | Brundage | G06T 1/0071 235/435 |
| 2008/0209545 A1* | 8/2008 | Asano | H04L 9/3273 726/19 |
| 2011/0152632 A1 | 6/2011 | Le Neel et al. | |
| 2012/0130645 A1* | 5/2012 | Garudadri | A61B 5/0024 702/19 |
| 2012/0143093 A1 | 6/2012 | Stirling et al. | |
| 2013/0004923 A1* | 1/2013 | Utter, II | G06F 19/3475 434/127 |
| 2014/0028539 A1 | 1/2014 | Newham et al. | |
| 2014/0059658 A1 | 2/2014 | Stecher | |
| 2014/0179341 A1 | 6/2014 | Sydir et al. | |

FOREIGN PATENT DOCUMENTS

| | | |
|---|---|---|
| CN | 103530977 | 1/2014 |
| KR | 1020090031060 A | 3/2009 |
| RU | 2502204 | 12/2013 |
| RU | 2509451 | 3/2014 |
| WO | 2013096954 A1 | 6/2013 |

OTHER PUBLICATIONS

European Patent Office, "Communication pursuant to Rules 70(2) and 70a(2) EPC," issued in connection with European Application No. 15844019.8, dated May 16, 2018, 1 page.

International Searching Authority, "International Search and Written Opinion," issued in connection with International Application No. PCT/US2015/051957, dated Dec. 16, 2015, 15 pages.

International Bureau, "International Preliminary Report on Patentability," issued in connection with International Application No. PCT/US2015/051957, dated Mar. 28, 2017, 11 pages.

Russian Patent Office, "Office Action," issued in connection with Russian Application No. 2017105793/08 (010255), dated Apr. 26, 2018, 6 pages.

Russian Patent Office, "Search Report," issued in connection with Russian Application No. 2017105793/08 (010255), dated Apr. 26, 2018, 2 pages.

China National Intellectual Property Administration, "First Office Action," mailed in connection with Chinese Patent Application No. 201580045173.8, dated Aug. 5, 2019, 13 pages.

* cited by examiner

FUZZY FINGERPRINTING OF COMMUNICATING WEARABLES

TECHNICAL FIELD

Embodiments described herein generally relate to wearable devices, and more particularly, to techniques for making identity determinations based upon detection of collections of wearable devices.

BACKGROUND ART

People carry an increasing number of mobile and wearable devices. Most of these devices are able to communicate wirelessly using WI-FI®, Bluetooth®, NFC (Near-Field Communications), infrared, etc. protocols, (WI-FI is a registered certification mark of Wi-Fi Alliance, BLUETOOTH is a registered certification mark of Bluetooth SIG, Inc.) These wearable devices talk to each other and they talk to external devices outside of the body area network (BAN).

A set of wearable devices (SWD) communicating wirelessly and over a BAN will inevitably leak information about the person carrying this set. Even if the communications are encrypted and their timing, size and content (e.g., MAC (Media Access Control) addresses or other IDs) are randomized, an external observer may still be able to determine the number of communicating devices and their types.

One approach would be to detect the parts of electromagnetic and acoustic spectra used for communication and map them to typical existing consumer devices. As an example, detecting a pair of communicating Bluetooth interfaces, a single Wi-Fi interface and a single 3G device will give a weak fingerprint. If, for example, communications also include infrared this will be a much stronger (rarer) fingerprint. Such primitive fingerprinting is possible even before deep inspection of the transmissions' timing and data, and may give rise to significant privacy and anonymity concerns.

DESCRIPTION OF EMBODIMENTS

Figure 1:
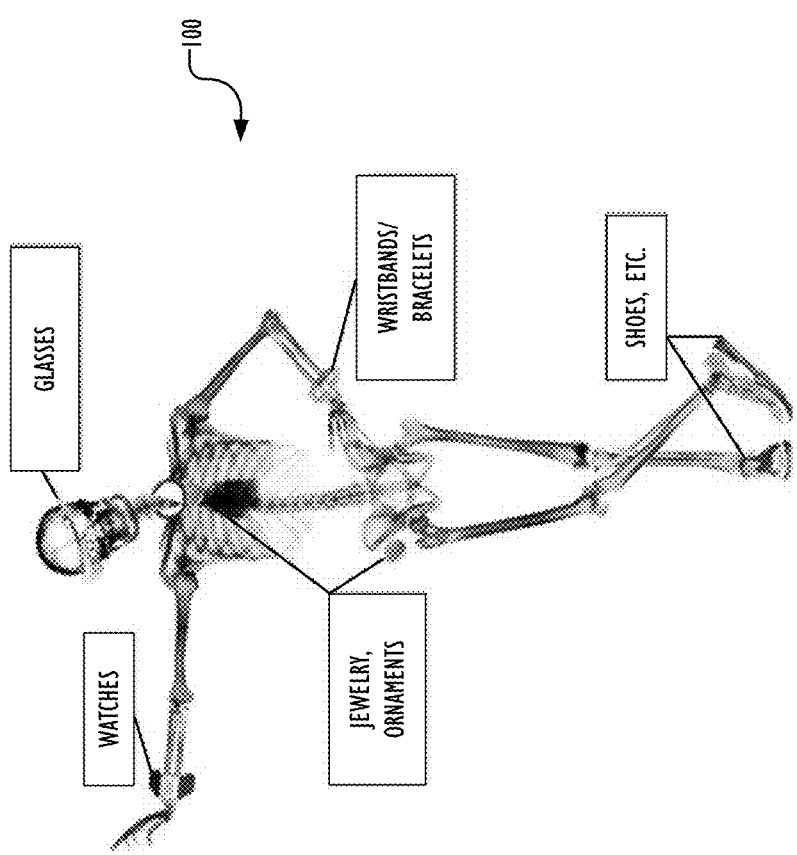
FIG. 1 is a block diagram illustrating a body area network according to one embodiment.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "a programmable device" can refer to a single programmable device or a plurality of programmable devices working together to perform the function described as being performed on or by a programmable device. Similarly, "a machine-readable medium" can refer to a single physical medium or a plurality of media that together may store the material described as being stored on the machine-readable medium.

As used herein, the term "malware" refers to any software used to disrupt operation of a programmable device, gather sensitive information, or gain access to private systems or networks. Malware includes computer viruses (including worms, Trojan horses, etc.), ransomware, spyware, adware, scareware, and any other type of malicious program.

We propose to combine the features extracted from communications generated by a set of wearable devices into fingerprints, referred to herein as fingerprint of a set of wearable devices or F(SWD)s. Such fingerprints can subsequently be compared to perform a wide variety of actions, both positive and negative.

The features comprising a fingerprint may include: (a) Type of transmission or communication (analog/digital, AM/FM, packet/continuous, connection or unidirectional, etc.); (b) Strength, period/timing, spectral properties, medium; (c) Packet size/timing/distribution (temporal and spacial, e.g. when some emissions can be attributed to specific body parts and medical devices); (d) Protocol artifacts (e.g. source/destination ports, ACK number, SYN, version, hop limit, traffic class, etc.); (e) Plaintext data extracted from transmissions (e.g. MAC address or Bluetooth ID); (f) Decrypted data (if available); and (g) Data and results of protocol communication for any device (e.g. whether connection, identification or authentication was successful). These features are illustrative and by way of example only, and other features may be used to generate a fingerprint as desired.

FIG. 1 is a block diagram illustrating a BAN 100 according to one embodiment, formed by a collection of wearable devices, in this example, glasses, watches, jewelry and ornaments, wristbands and bracelets, and shoes, each of which may communicate with each other or with external devices. This collection is just one example of a collection forming a BAN 100; each individual may wear a different collection of wearable communicating devices. Furthermore, although described herein using the term "wearable," the term is intended to include both removable devices (such as glasses) and non-removable devices, such as devices that may be implanted or otherwise permanently attached to a person's body. For example, microchips can be implanted subcutaneously for use as identification tokens. The BAN 100 may include any mixture of removable and non-removable communicating devices. Furthermore, the term "wearable" is intended to include devices that are actually disposed on a person's body as well as devices that are proximate to the body. For example, a smartphone carried in another object, such as a backpack or a purse would be considered as worn if the other object is being carried or is otherwise in close proximity of the body, including a device disposed alongside the person, but not actually worn or carried. For example, a smartphone that would be part of the BAN 100 when carried in a backpack worn by the person may also be part of the BAN 100 when the backpack is taken off and placed on a surface next to the person.

At least three difference classes or types of wearable devices may be included in the BAN 100: (a) actively communicating devices such as smart phones or tablets; (b) devices that communicate in response to receiving a signal from another device, such as radio frequency identification (RFID) devices; and (c) passive devices where a physical activity is required to cause the device to generate a signal, such as a car key that requires pressing a button to cause the key to communicate with the car. These classes are not intended to be exclusive, other classes may be identified, and a device may change its communication behavior upon an interaction, such as a smart watch that communicates certain data upon being touched by the wearer.

In some BANs 100, the collection of wearable devices may include a hub device (not illustrated in FIG. 1), for example a smart phone, that organizes the communications among the collection of wearable devices. In such an embodiment, the analysis unit 230 may distinguish wearable devices as part of the BAN 100 by detecting communications with the hub device. The hub device typically is a mobile device such as a smart phone, but may be any type of device, including a device specifically designed to act as a hub for the BAN 100.

Figure 2:
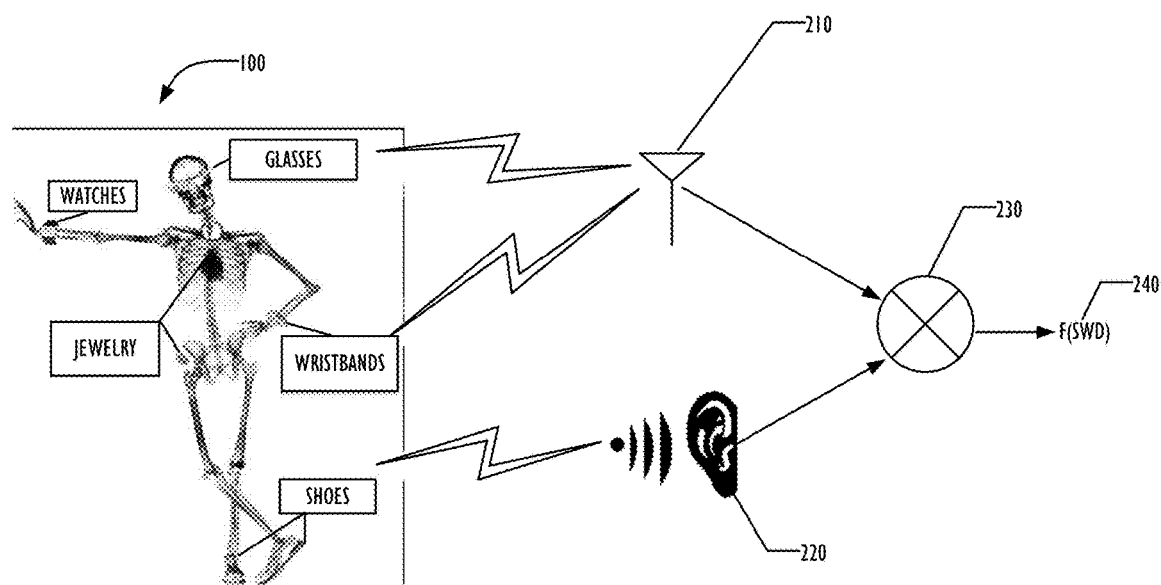
FIG. 2 is a block diagram illustrating a system for fingerprinting a body area network according to one embodiment.
Figure 3:
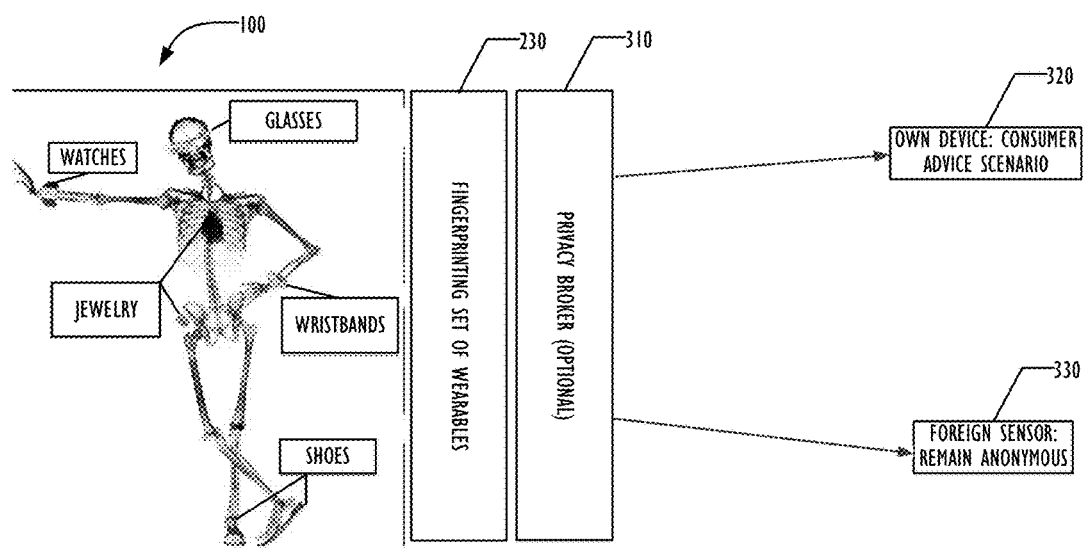
FIG. 3 is a block diagram illustrating a system for controlling privacy according to another embodiment.

FIG. 2 is a block diagram illustrating creating a F(SWD) 240 corresponding to the BAN 100 of FIG. 1, according to one embodiment. Depending on the nature of the devices in the BAN 100, one or more sensors, such as antennas 210, may collect electromagnetic energy, allowing analysis of electromagnetic signals to determine data such as Internet Protocol (IP) traffic, Bluetooth traffic, infrared traffic, etc. Other devices, such as audio microphones 220, may be used to collect non-electromagnetic energy, such as audio information from sound-based communications. Any desired or convenient technology may be used for collecting the electromagnetic and non-electromagnetic energy, including any type of sensors. The signals detected by antennas 210 and microphones 220, as illustrated in FIG. 2, may then be analyzed and combined by an analysis unit 230 to produce the F(SWD) 240. Although a single antenna 210 and microphone 220 is illustrated in FIG. 2 for clarity, any number of sensors of any type may be used.

The sensors used to collect data from the BAN 100 and the analysis unit 230 do not need to be capable of interpreting the data that is communicated by the wearable devices. Instead, the analysis unit 230 may recognize patterns in the communications received by the sensors 210 and 220, allowing recognition that the pattern of one BAN 100 matches that of a previously detected BAN 100, with the further suggestion that the associated people also match, providing additional information for an identity profile for a person. For example, some of the communication data that is collected and analyzed may be encrypted, but no assumption is made that encrypted data can be decrypted for purposes of the fingerprint. Thus the signals detected by the sensors 210, 220 may be analyzed without interpreting data payloads carried by the signals and without identifying specific devices. For example, the analysis unit 230 may be able to recognize destination or source information contained in the communications without interpreting data being sent from the source or to the destination. In another example, the analysis unit 230 may be able to recognize a type of device by recognizing patterns of communications such as sequences of signals or packets that are associated with a type of device or by recognizing protocols employed for the communication.

Any desired technique may be used for building the fingerprint from the communications detected from the BAN 100. For example, a fingerprint may be generated using binary values for different device types, assigning a 0 or 1 depending on the absence or presence of the device type. More complex fingerprints may involve the ability to detect identification data for the devices in their communications and using that identification data as part of the fingerprint. The number of devices detected in the BAN 100 may be included as part of the fingerprint.

The resulting F(SWD) 240 can then be matched with other F(SWD)s for identification or other purposes. Various embodiments may use F(SWD) matching for different purposes. In some embodiments, the F(SWD) 240 may be a fuzzy fingerprint that an embodiment may be able to match with various subsets and supersets of a previously obtained or generated F(SWD).

Because the set of removable wearable devices for a person may vary from time to time, the ability to match an F(SWD) 240 calculated from one set of devices with a F(SWD) calculated from a slightly different set of devices would be useful. Thus, for example, the BAN 100 detected by the sensors 210 or 220 may be a subset or a superset of a BAN associated with the other F(SWD) or may share a common subset with the other BAN.

In some situations, some devices, such as the hub device referenced above, may be more important in the recognition process than others, such that presence or absence of a non-hub device may not change the fuzzy signature sufficiently to prevent correlation of the F(SWD) 240, while presence or absence of the hub device might do so.

The functionality of matching the F(SWD) 240 with other F(SWD)s may be performed by the analysis unit 230 or another programmable device functioning as a comparison or action-taking unit (not illustrated) to which the analysis unit sends the F(SWD) 240. The comparison or action-taking unit, if separate from the analysis unit 230, may be connected to the analysis unit 230 via one or more networks, either persistently or on an on-demand basis.

By matching or correlating the F(SWD) 240 of BAN 100 with other, previously obtained or generated, F(SWD)s, numerous different actions may be taken, including recognizing and tracking the person associated with the BAN 100, providing customized communications to that person, and authorize the person to perform certain activities, including entry into a controlled area. The above list of actions is illustrative and by way of example only, and other actions may be taken based on a match between the F(SWD) 240 of a detected BAN 100 and a previously obtained or generated F(SWD).

By itself, the F(SWD) 240 may be insufficient to identify the individual person associated with the BAN 100, although it may be sufficient to distinguish two individuals from each other. For example, the F(SWD) 240 generated for one BAN 100 may not be unique and other people may have identical F(SWD)s 240, depending on the nature of the devices that the two individuals wear. Other services, such as facial recognition (as well as other biometric methods: video, audio, voice, weight, size, smell, walking traits, etc.), may be used to associate the F(SWD) 240 with a specific individual. Thus, the F(SWD) 240 may be sufficient to distinguish a first person from a second person or at least to limit the set of individuals by excluding those individuals with different F(SWD)s 240, and when combined with other information may be used to strengthen identification of person X as Mr. Smith or Ms. Jones.

For example, a retailer may correlate the F(SWD)s 240 of all people who connect to their free Wi-Fi network and keep the data about the device linked with the F(SWD)s. In another example, face recognition may be used in conjunction with the collection of F(SWD)s to enhance personal recognition. This personal recognition action may allow tracking the activity associated with the F(SWD) 240, and by implication, of the person associated with the F(SWD) 240.

In another example, analysis units 230 may provide F(SWD)s 240 and location data, allowing tracking the location of a person based on the F(SWD) 240. The precision of said location data may be based on a service providing location of any quality (coarse or fine or triangulation-based and employing Global Positioning System (GPS), WiFi, Near Field Communications (NFC), BlueTooth, or any other kind of location indicator, for example by using proximity to a known sensor, server or location). In yet another example, the analysis unit 230 may identify a set of F(SWD)s 240 and link them with a group of people.

While the functional uses of F(SWD)s 240 described above could generally be considered a use of the F(SWD) 240 for identification and tracking purposes, other functionality may allow ways to anonymize the BAN 100. For example, an analysis unit 230 may be worn with the person associated with the BAN 100 that can dynamically change, temporarily delay, or redirect communications detectable externally, to make the F(SWD) 240 unique and unpredictable. In another example, an analysis unit 230 may be capable of "cloaking" the F(SWD)s of nearby individuals by simulating communications that appear to be from non-present wearable devices (including random devices) to make the F(SWD) 240 similar to many others, or having the device mask its communication in such a way that it pretends to be a different type of device, such as a smart phone that generates communications that would make it appear to be a different type of smart phone.

In one embodiment, the system may leverage services of a privacy broker 310 in order to exchange fingerprint information with appropriate devices. For more information on privacy brokers, see U.S. Pat. Pub. No. 20140059658, which is incorporated herein for all purposes. The privacy broker 310 may use the F(SWD) 240 for identification of the BAN 100 and the wearer, then use privacy broker services to allow or prohibit providing the F(SWD) 240 and other identifying information to other systems. For example, where the device 320 requesting information from the privacy broker 310 is associated with the person associated with BAN 100, as identified from F(SWD) 240, the privacy broker may provide the requested information. But where the device 330 is a foreign sensor, i.e., not one associated with the person, the privacy broker 310 may refuse to transmit the F(SWD) 240 or other stored information associated with BAN 100 and associated person, allowing the person associated with BAN 100 to remain anonymous.

In some embodiments, the analysis unit 230 may obtain previously generated F(SWD)s for matching with the F(SWD) 240 from a database of F(SWD) information, which may be maintained either local to the analysis unit 230 or remotely. In other embodiments, the analysis unit 230 may send the F(SWD) 240 to another programmable system to perform the matching. Similarly, the analysis unit 230 may store a newly generated F(SWD) 240 in such a database of F(SWD) information or may provide the F(SWD) 240 to another programmable system for storing the newly generated F(SWD) 240.

Figure 4:
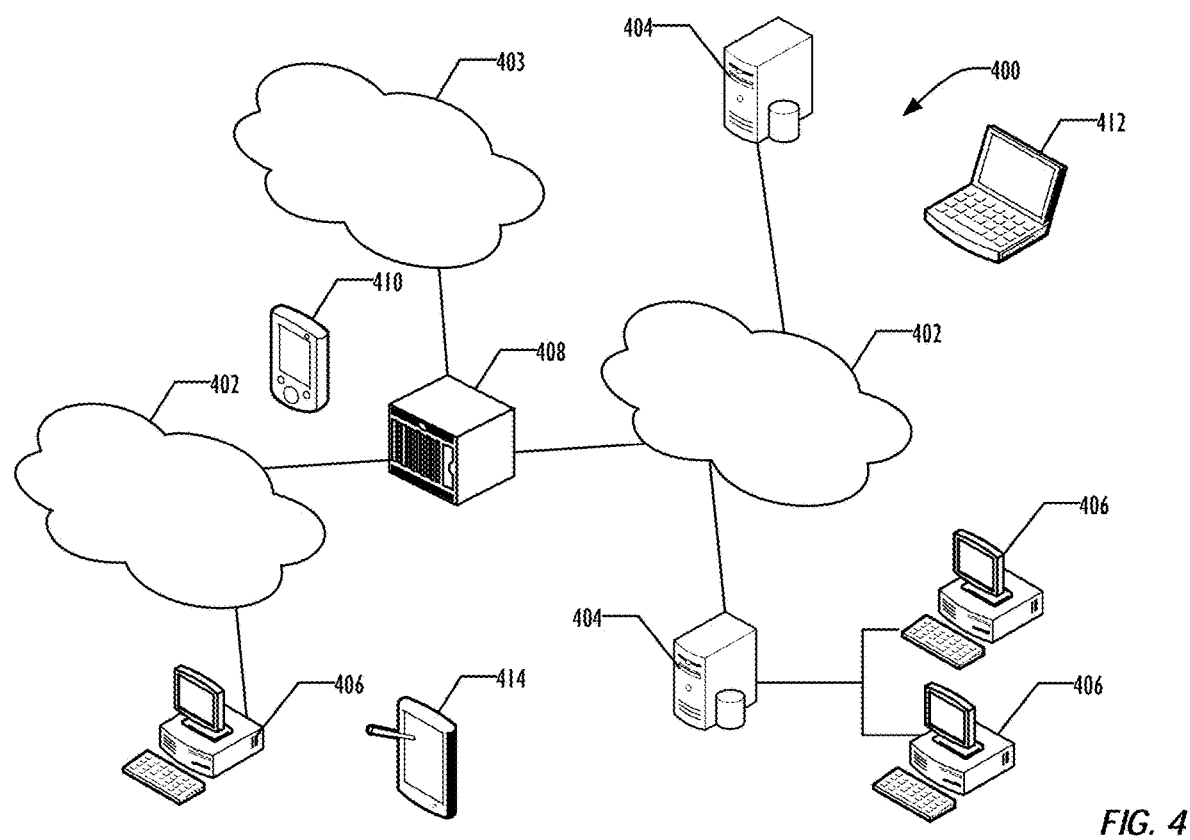
FIG. 4 is a graph illustrating a body area network and a network of systems for creating and using body area network fingerprints according to one embodiment.

Referring now to FIG. 4, an example infrastructure 400 in which the techniques described above may be implemented is illustrated schematically. Infrastructure 400 contains computer networks 402. Computer networks 402 may include many different types of computer networks available today, such as the Internet, a corporate network, or a Local Area Network (LAN). Each of these networks can contain wired or wireless programmable devices and operate using any number of network protocols (e.g., TCP/IP). Networks 402 may be connected to gateways and routers (represented by 408), end user computers 406, and computer servers 404. Infrastructure 400 also includes cellular network 403 for use with mobile communication devices. Mobile cellular networks support mobile phones and many other types of devices. Mobile devices in the infrastructure 400 are illustrated as mobile phones 410, laptops 412, and tablets 414. A mobile device such as mobile phone 410 may interact with one or more mobile provider networks as the mobile device moves, typically interacting with a plurality of mobile network towers (not shown) for connecting to the cellular network 403. Although referred to as a cellular network in FIG. 4, a mobile device may interact with towers of more than one provider network, as well as with multiple non-cellular devices such as wireless access points and routers 408. In addition, the mobile devices 410, 412, and 414 may interact with non-mobile devices such as computers 404 and 406 for desired services, which may include providing the F(SWD) collection and analysis services described above. The functionality of the analysis unit 230 may be implemented in any device or combination of devices illustrated in FIG. 4.

Figure 5:
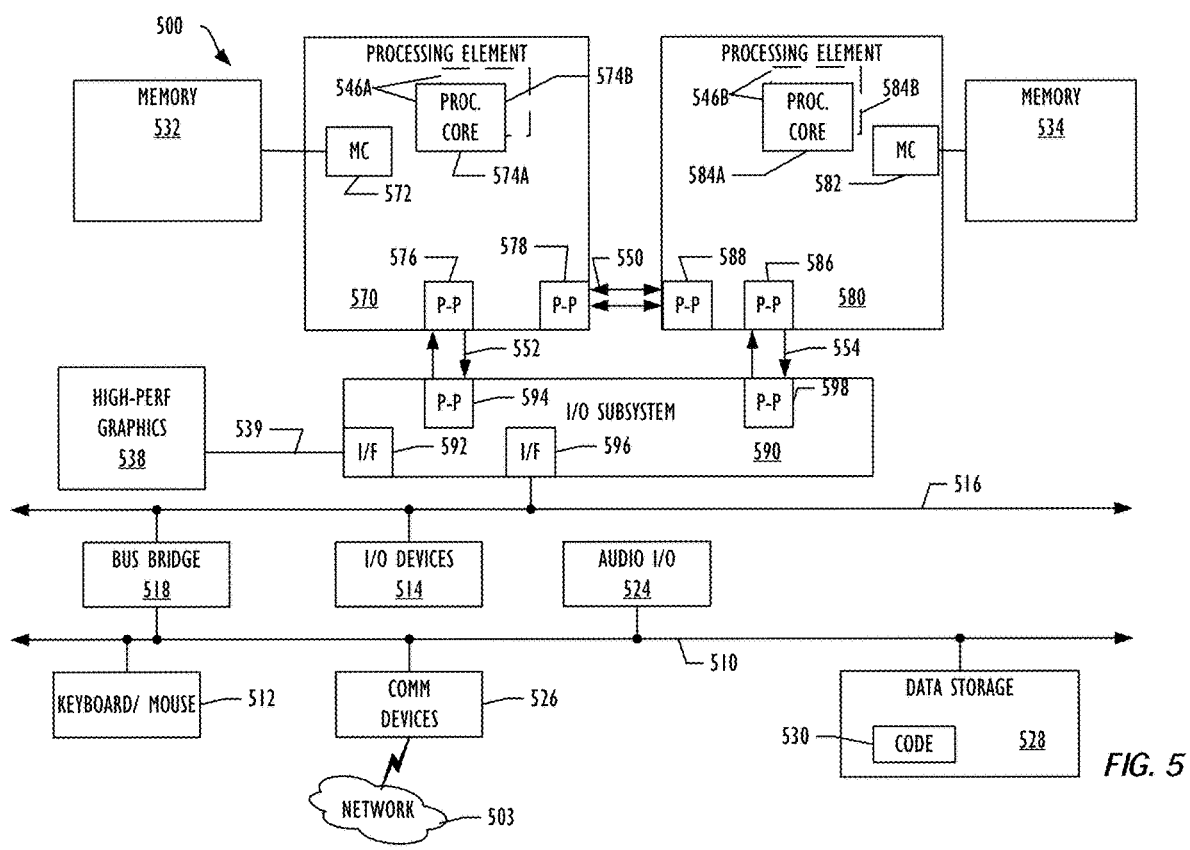
FIGS. 5-6 are a block diagrams illustrating computing devices for use with techniques described herein according to one embodiment.

Referring now to FIG. 5, a block diagram illustrates a programmable device 500 that may be used within analysis unit 230 in accordance with one embodiment. The programmable device illustrated in FIG. 5 is a multiprocessor programmable device 500 that includes a first processing element 570 and a second processing element 580. While two processing elements 570 and 580 are shown, an embodiment of programmable device 500 may also include only one such processing element.

Programmable device 500 is illustrated as a point-to-point interconnect system, in which the first processing element 570 and second processing element 580 are coupled via a point-to-point interconnect 550. Any or all of the interconnects illustrated in FIG. 5 may be implemented as multi-drop bus rather than point-to-point interconnects.

As illustrated in FIG. 5, each of processing elements 570 and 580 may be multicore processors, including first and second processor cores (i.e., processor cores 574*a* and 574*b* and processor cores 584*a* and 584*b*). Such cores 574*a*, 574*b*, 584*a*, 584*b* may be configured to execute instruction code in a manner similar to that discussed above in connection with FIGS. 1-4. However, other embodiments may use processing elements that are single core processors as desired. In embodiments with multiple processing elements 570, 580, each processing element may be implemented with different numbers of cores as desired.

Each processing element 570, 580 may include at least one shared cache 546. The shared cache 546*a*, 546*b* may store data (e.g., instructions) that are utilized by one or more components of the processing element, such as the cores 574*a*, 574*b* and 584*a*, 584*b*, respectively. For example, the shared cache may locally cache data stored in a memory 532, 534 for faster access by components of the processing elements 570, 580. In one or more embodiments, the shared cache 546a, 546b may include one or more mid-level caches, such as level 2 (L2), level 3 (L3), level 4 (L4), or other levels of cache, a last level cache (LLC), or combinations thereof.

While FIG. 5 illustrates a programmable device with two processing elements 570, 580 for clarity of the drawing, the scope of the present invention is not so limited and any number of processing elements may be present. Alternatively, one or more of processing elements 570, 580 may be an element other than a processor, such as an graphics processing unit (GPU), a digital signal processing (DSP) unit, a field programmable gate array, or any other programmable processing element. Processing element 580 may be heterogeneous or asymmetric to processing element 570. There may be a variety of differences between the processing elements 570, 580 in terms of a spectrum of metrics of merit including architectural, microarchitectural, thermal, power consumption characteristics, and the like. These differences may effectively manifest themselves as asymmetry and heterogeneity amongst the processing elements 570, 580. In some embodiments, the various processing elements 570, 580 may reside in the same die package.

First processing element 570 may further include memory controller logic (MC) 572 and point-to-point (P-P) interfaces 576 and 578. Similarly, second processing element 580 may include a MC 582 and P-P interfaces 586 and 588. As illustrated in FIG. 5, MCs 572 and 582 couple the processing elements 570, 580 to respective memories, namely a memory 532 and a memory 534, which may be portions of main memory locally attached to the respective processors. While MC logic 572 and 582 is illustrated as integrated into the processing elements 570, 580, in some embodiments the MC logic may be discrete logic outside the processing elements 570, 580 rather than integrated therein.

Processing element 570 and processing element 580 may be coupled to an I/O subsystem 590 via P-P interfaces 576 and 586 and P-P interconnects 552 and 554, respectively. As illustrated in FIG. 5, I/O subsystem 590 includes P-P interfaces 594 and 598. Furthermore, I/O subsystem 590 includes an interface 592 to couple I/O subsystem 590 with a high performance graphics engine 538. In one embodiment, bus 549 may be used to couple graphics engine 538 to I/O subsystem 590. Alternately, a point-to-point interconnect 539 may couple these components.

In turn, I/O subsystem 590 may be coupled to a first link 516 via an interface 596. In one embodiment, first link 516 may be a Peripheral Component Interconnect (PCI) bus, or a bus such as a PCI Express bus or another I/O interconnect bus, although the scope of the present invention is not so limited.

As illustrated in FIG. 5, various I/O devices 514 may be coupled to first link 516, along with a bridge 518 which may couple first link 516 to a second link 510. In one embodiment, second link 510 may be a low pin count (LPC) bus. Various devices may be coupled to second link 510 including, for example, a keyboard/mouse 512, communication device(s) 526 (which may in turn be in communication with the computer network 503), and a data storage unit 528 such as a disk drive or other mass storage device which may include code 530, in one embodiment. The code 530 may include instructions for performing embodiments of one or more of the techniques described above. Further, an audio I/O 524 may be coupled to second bus 510.

Note that other embodiments are contemplated. For example, instead of the point-to-point architecture of FIG. 5, a system may implement a multi-drop bus or another such communication topology. Although links 516 and 510 are illustrated as busses in FIG. 5, any desired type of link may be used. Also, the elements of FIG. 5 may alternatively be partitioned using more or fewer integrated chips than illustrated in FIG. 5. For example, the components may be implemented as networked (LAN, enterprise network, Internet and/or distributed in the cloud) computing devices (real or virtual) or microcontrollers which jointly perform the 230 function.

Although not illustrated in FIG. 5, the programmable device 500 may also contain a circuitry to provide a trusted execution environment, allowing some or all of the techniques described above for generating and using F(SWD)s in a trusted environment outside of an operating system for the programmable device 500. Such trusted execution environments typically are cryptographically controlled and restrict execution to only executable code signed with a cryptographic key. The trusted execution environment may be implemented as a separate chip or chipset from the processing elements, or may be packaged as part of a chipset providing some or all of the elements illustrated in FIG. 5.

Figure 6:
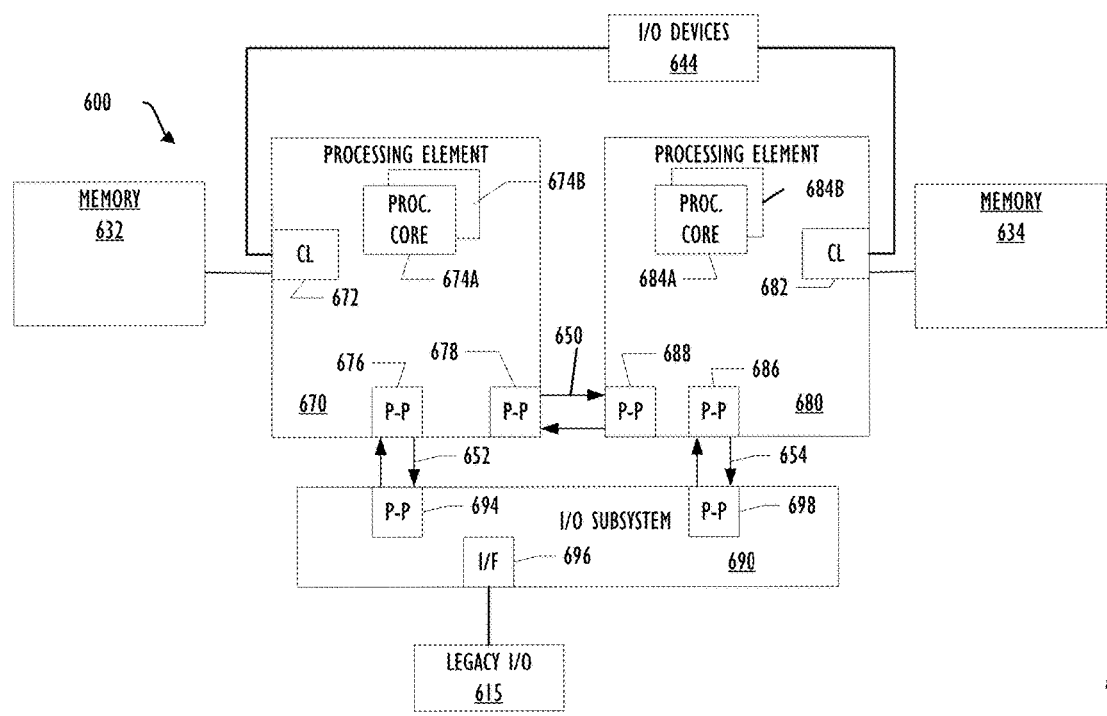

Referring now to FIG. 6, a block diagram illustrates a programmable device 600 according to another embodiment. Certain aspects of FIG. 5 have been omitted from FIG. 6 in order to avoid obscuring other aspects of FIG. 6.

FIG. 6 illustrates that processing elements 670, 680 may include integrated memory and I/O control logic ("CL") 672 and 682, respectively. In some embodiments, the CL 672, 682 may include memory control logic (MC) such as that described above in connection with FIG. 5. In addition, CL 672, 682 may also include I/O control logic. FIG. 6 illustrates that not only may the memories 632, 634 be coupled to the CL 672, 682, but also that I/O devices 644 may also be coupled to the control logic 672, 682. Legacy I/O devices 615 may be coupled to the I/O subsystem 690 by interface 696. Each processing element 670, 680 may include multiple processor cores, illustrated in FIG. 6 as processor cores 674A, 674B, 684A, and 684B. As illustrated in FIG. 6, I/O subsystem 690 includes P-P interfaces 694 and 698 that connect to P-P interfaces 676 and 686 of the processing elements 670 and 680 with interconnects 652 and 654. Processing elements 670 and 680 may also be interconnected by interconnect 650 and interfaces 678 and 688, respectively.

As with the programmable device 500, the programmable device 600 may contain a trusted execution environment (not illustrated).

The programmable devices depicted in FIGS. 5 and 6 are schematic illustrations of embodiments of programmable devices which may be utilized to implement various embodiments discussed herein. Various components of the programmable devices depicted in FIGS. 5 and 6 may be combined in a system-on-a-chip (SoC) architecture.

Figure 7:
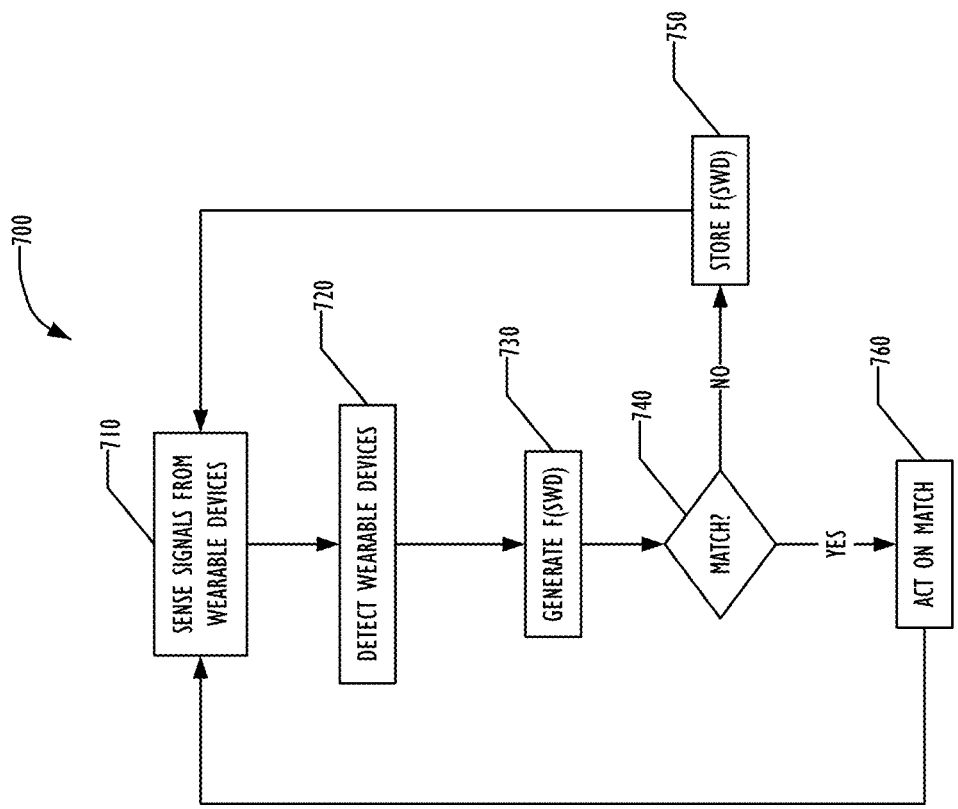
FIG. 7 is a flowchart illustrating a technique for fingerprinting of wearables according to one embodiment.

Turning now to FIG. 7, a flowchart illustrates a technique 700 for fingerprinting a collection of wearable devices and using those fingerprints according to one embodiment. In block 710, one or more sensors such as antenna 210 and microphone 220 are used to sense signals from communicating wearable devices that together form a body network. In block 720, the available signals may be analyzed to detect signals that have characteristics of wearable devices. Depending on the nature of the specific sensors used, directional and location information about the source of the signals may be used to discriminate among all available signals, to determine which of the available signals corresponding to wearable devices appear to be associated with a single BAN 100. Other information, including signal content, may also be used to select the signals that are associated with a BAN 100. Depending on the environment and situation, multiple BANs 100 may be detected simultaneously. Directional antennas and microphones may be used to improve BAN recognition and resolution.

In block 730, the signals associated with the BAN 100 are further analyzed to generate a F(SWD) 240 for the BAN 100, using any desired technique for generating a fingerprint of a collection of items. Preferably, the fingerprinting technique generates a fingerprint for a given set of wearable devices that allows for fuzzy matching. Fuzzy matching techniques are known in the art, and allow for finding objects that match approximately even if not matching exactly. If the detected F(SWD) 240 matches in block 740 (exactly or fuzzily) a previously known F(SWD) then in block 760 some action may be taken as a result of the match, such as the recognition or tracking actions described above. In one embodiment, if the F(SWD) 240 does not match any previously known signature, the new F(SWD) 240 may be added to a collection of F(SWD)s in block 750 for use in further matching exercises. The collection of F(SWD)s may be stored using any desired technique, preferably using techniques that are known in the art for storing signatures that are to be matched using fuzzy matching.

The following examples pertain to further embodiments.

Example 1 is a machine readable medium, on which are stored instructions for recognizing a person by a programmable device, comprising instructions that when executed cause the programmable device to: detect signals from a first plurality of wearable devices proximate with or disposed on an individual; and generate a first body area network fingerprint corresponding to the detected signals; and match the first body area network fingerprint with a second body area network fingerprint associated with a second plurality of wearable devices.

In Example 2, the subject matter of Example 1 can optionally further include a first sensor, configured to sense electromagnetic signals; and a second sensor, configured to sense non-electromagnetic signals.

In Example 3, the subject matter of Example 1 can optionally include wherein the second body area network fingerprint is associated with an individual.

In Example 4, the subject matter of Example 1 can optionally include wherein a subset of the first plurality of wearable devices corresponds to a subset of the second plurality of wearable devices.

In Example 5, the subject matter of any of Examples 1-4 can optionally include wherein the instructions that when executed cause the programmable device to generate a first body area network fingerprint comprise instructions that when executed cause the programmable device to: identify communications between the first plurality of wearable devices and a hub device.

In Example 6, the subject matter of any of Examples 1-4 can optionally include wherein the instructions that when executed cause the programmable device to detect signals comprise instructions that when executed cause the programmable device to: analyze the signals without interpreting data payloads carried by the signals.

In Example 7, the subject matter of any of Examples 1-4 can optionally include wherein the instructions further comprise instructions that when executed cause the programmable device to: associate location information with the first body area network fingerprint; and track movement of the individual based on the location information.

In Example 8, the subject matter of any of Examples 1-4 can optionally include wherein the instructions further comprise instructions that when executed cause the programmable device to: link a plurality of body area network fingerprints with a group of people.

In Example 9, the subject matter of any of Examples 1-4 can optionally include wherein the instructions further comprise instructions that when executed cause the programmable device to: simulate communications that appear to be from a non-present device.

Example 10 is a method of fingerprinting a set of wearable devices, comprising: detecting by sensors communications sent to or from the set of wearable devices; analyzing by an analysis unit the communications without interpreting data payloads contained in the communications; generating a fuzzy fingerprint corresponding to types of devices contained in the set of wearable devices; and matching the fuzzy fingerprint with a previously generated fuzzy fingerprint.

In Example 11, the subject matter of Example 10 can optionally include wherein the sensors comprise directional sensors.

In Example 12, the subject matter of any of Examples 10-11 can optionally include wherein matching the fuzzy fingerprint comprises: sending the fuzzy fingerprint to a remote programmable system for matching.

In Example 13, the subject matter of any of Examples 10-11 can optionally include wherein matching the fuzzy fingerprint comprises: comparing the fuzzy fingerprint with fingerprints stored in a database.

In Example 14, the subject matter of any of Examples 10-11 can optionally include: associating location data with the fuzzy fingerprint; and storing the fuzzy fingerprint and associated location data in a database.

Example 15 is a body area network recognizer, comprising: means for sensing, configured to detect signals corresponding to communications to or from a first set of wearable devices; and means for analyzing, configured to analyze the detected signals and generate a fuzzy fingerprint of the set of wearable devices, wherein the fingerprint is a fuzzy fingerprint, matchable with a fingerprint of a second set of wearable devices, the second set of wearable devices having a subset in common with a subset of the first set of wearable devices.

In Example 16, the subject matter of Example 15 can optionally include wherein the body area network recognizer is a wearable device.

In Example 17, the subject matter of any of Examples 15-16 can optionally include: means for communicating, configured to send the fingerprint to a remote device for matching with previously generated fingerprints.

Example 18 is a system for tracking an individual, comprising: a sensor; a programmable device, coupled to the sensor; and a memory, coupled to the programmable device, on which are stored instructions that when executed cause the programmable device to: recognize patterns contained in signals detected by the sensor; and generate a first fingerprint of a first set of wearable devices corresponding to the signals.

In Example 19, the subject matter of Example 18 can optionally include wherein the instructions further comprise instructions that when executed cause the programmable device to: match the first fingerprint with a second fingerprint.

In Example 20, the subject matter of Example 19 can optionally include wherein a subset of the first set of wearable devices corresponds to a subset of a second set of wearable devices associated with the second fingerprint.

In Example 21, the subject matter of Example 18 can optionally include wherein the instructions further comprise instructions that when executed cause the programmable device to associate a location data with the first fingerprint.

In Example 22, the subject matter of Example 21 can optionally include wherein the instructions further comprise instructions that when executed cause the programmable device to store the location data and the first fingerprint.

In Example 23, the subject matter of any of Examples 18-22 can optionally include wherein the instructions further comprise instructions that when executed cause the programmable device to: generate signals corresponding to devices not contained in the first set of wearable devices.

In Example 24, the subject matter of any of Examples 18-22 can optionally include wherein the instructions that when executed cause the programmable device to recognize patterns contained in signals detected by the sensor comprise instructions that when executed cause the programmable device to recognize patterns without interpreting data payloads contained in the signals.

In Example 25, the subject matter of any of Examples 18-22 can optionally include wherein at least some of the signals detected by the sensor comprise encrypted signals, and wherein the instructions that when executed cause the programmable device to recognize patterns contained in signals detected by the sensor comprise instructions that when executed cause the programmable device to recognize patterns without decrypting the encrypted signals.

Example 26 is a machine readable medium, on which are stored instructions for recognizing a person by a programmable device, comprising instructions that when executed cause the programmable device to: detect signals from a first plurality of wearable devices proximate with or disposed on an individual; and generate a first body area network fingerprint corresponding to the detected signals; and match the first body area network fingerprint with a second body area network fingerprint associated with a second plurality of wearable devices, wherein the second body area network fingerprint is associated with an individual.

In Example 27, the subject matter of Example 26 can optionally include wherein a subset of the first plurality of wearable devices corresponds to a subset of the second plurality of wearable devices.

In Example 28, the subject matter of any of Examples 26-27 can optionally include wherein the instructions that when executed cause the programmable device to generate a first body area network fingerprint comprise instructions that when executed cause the programmable device to: identify communications between the first plurality of wearable devices and a hub device.

In Example 29, the subject matter of any of Examples 26-27 can optionally include wherein the instructions that when executed cause the programmable device to detect signals comprise instructions that when executed cause the programmable device to: analyze the signals without interpreting data payloads carried by the signals.

In Example 30, the subject matter of any of Examples 26-27 can optionally include wherein the instructions further comprise instructions that when executed cause the programmable device to: associate location information with the first body area network fingerprint; and track movement of the individual based on the location information.

In Example 31, the subject matter of any of Examples 26-27 can optionally include wherein the instructions further comprise instructions that when executed cause the programmable device to: link a plurality of body area network fingerprints with a group of people.

In Example 32, the subject matter of any of Examples 26-27 can optionally include wherein the instructions further comprise instructions that when executed cause the programmable device to: simulate communications that appear to be from a non-present device.

Example 33 is a system for tracking an individual, comprising: a sensor; a programmable device, coupled to the sensor; and a memory, coupled to the programmable device, on which are stored instructions that when executed cause the programmable device to: recognize patterns contained in signals detected by the sensor; and generate a first fingerprint of a first set of wearable devices corresponding to the signals; and match the first fingerprint with a second fingerprint.

In Example 34, the subject matter of Example 33 can optionally include wherein a subset of the first set of wearable devices corresponds to a subset of a second set of wearable devices associated with the second fingerprint.

In Example 35, the subject matter of Example 33 can optionally include wherein the instructions further comprise instructions that when executed cause the programmable device to: associate a location data with the first fingerprint; and store the location data and the first fingerprint.

In Example 36, the subject matter of any of Examples 33-35 can optionally include wherein the instructions further comprise instructions that when executed cause the programmable device to: generate signals corresponding to devices not contained in the first set of wearable devices.

In Example 37, the subject matter of any of Examples 33-35 can optionally include wherein the instructions that when executed cause the programmable device to recognize patterns contained in signals detected by the sensor comprise instructions that when executed cause the programmable device to recognize patterns without interpreting data payloads contained in the signals.

Example 38 is a programmable device, comprising: a sensor to detect signals from a first plurality of wearable devices proximate with or disposed on an individual; and an analysis unit configured to generate a first body area network fingerprint corresponding to the detected signals; and match the first body area network fingerprint with a second body area network fingerprint associated with a second plurality of wearable devices.

In Example 39, the subject matter of Example 38 can optionally include a first sensor, configured to sense electromagnetic signals; and a second sensor configured to sense non-electromagnetic signals.

In Example 40, the subject matter of Example 38 can optionally include wherein the second body area network fingerprint is associated with an individual.

In Example 41, the subject matter of Example 38 can optionally include wherein a subset of the first plurality of wearable devices corresponds to a subset of the second plurality of wearable devices.

In Example 42, the subject matter of any of Examples 38-41 can optionally include wherein the analysis unit is further configured to identify communications between the first plurality of wearable devices and a hub device.

In Example 43, the subject matter of any of Examples 38-41 can optionally include wherein the programmable device is configured to analyze the signals without interpreting data payloads carried by the signals.

In Example 44, the subject matter of any of Examples 38-41 can optionally include wherein the programmable device is further configured to: associate location information with the first body area network fingerprint; and track movement of the individual based on the location information.

In Example 45, the subject matter of any of Examples 38-41 can optionally include wherein the instructions further comprise instructions that when executed cause the programmable device to: link a plurality of body area network fingerprints with a group of people.

In Example 46, the subject matter of any of Examples 38-41 can optionally include wherein the programmable device is further configured to simulate communications that appear to be from a non-present device.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A storage device comprising instructions that, when executed, cause a processor to:
   detect signals from a first plurality of wearable devices disposed on an unknown person;
   generate a first body area network fingerprint of the first plurality of wearable devices corresponding to the detected signals, the detected signals to be analyzed without interpreting data payloads corresponding to the detected signals;
   match the first body area network fingerprint with a second body area network fingerprint associated with a second plurality of wearable devices; and
   cloak at least one of the first body area network fingerprint or the second body area network fingerprint by simulating communications that appear to be from a non-present device.

2. The storage device of claim 1, further including:
   a first sensor-to sense electromagnetic signals; and
   a second sensor to sense non-electromagnetic signals.

3. The storage device of claim 1, wherein a subset of the first plurality of wearable devices corresponds to a subset of the second plurality of wearable devices.

4. The storage device of claim 1, wherein the instructions, when executed, cause the processor to identify communications between the first plurality of wearable devices and a hub device.

5. The storage device of claim 1, wherein the instructions, when executed, cause the processor to:
   associate location information with the first body area network fingerprint; and
   track movement of the unknown person based on the location information.

6. The storage device of claim 1, wherein the instructions, when executed, cause the processor to link a plurality of body area network fingerprints with a group of people.

7. A method of fingerprinting a first set of wearable devices, comprising:
   detecting, by executing an instruction with at least one processor, sensor communications corresponding to the first set of wearable devices;
   analyzing, by executing an instruction with the at least one processor, the sensor communications without interpreting data payloads contained in the sensor communications;
   generating, by executing an instruction with the at least one processor, a first fingerprint of the first set of wearable devices corresponding to types of devices contained in the set of wearable devices;
   matching, by executing an instruction with the at least one processor, the first fingerprint with a previously generated fingerprint associated with a second set of wearable devices, wherein the second set of wearable devices is associated with a person; and
   cloaking, by executing an instruction with the at least one processor, at least one of the first fingerprint or the previously generated fingerprint by simulating communications that appear to be from a non-present wearable device.

8. The method of claim 7, wherein the sensor communications include data from directional sensors.

9. The method of claim 7, wherein matching the first fingerprint with the previously generated fingerprint includes sending the first fingerprint and the previously generated fingerprint to a remote programmable system for matching.

10. The method of claim 7, wherein matching the first fingerprint with the previously generated fingerprint includes comparing the first fingerprint and the previously generated fingerprint with fingerprints stored in a database.

11. The method of claim 7, further including:
    associating location data with the first fingerprint; and
    storing the first fingerprint and associated location data in a database.

12. A body area network recognizer, comprising:
    a sensor-to detect signals corresponding to communications, the communications corresponding to a first set of wearable devices;
    an analysis unit to:
       analyze the detected signals; and
       generate a first fingerprint of the first set of wearable devices, the detected signals to be analyzed without interpreting data payloads carried by the detected signals; and
    a communication interface to send the first fingerprint to a remote device to be matched with a second fingerprint of a second set of wearable devices, the second set of wearable devices is associated with a person, the analysis unit to cloak the first fingerprint or the second fingerprint by simulating communications that appear to be from a non-present device.

13. The body area network recognizer of claim 12, wherein the body area network recognizer is a wearable device.

14. The body area network recognizer of claim 12, wherein the communication interface is to send the first fingerprint to the remote device for matching with the second fingerprint, the second fingerprint associated with previously generated fingerprints.

15. A system for tracking a person, comprising:
    a sensor;
    a programmable device, coupled to the sensor; and
    a memory, coupled to the programmable device, on which are stored instructions that, when executed, cause the programmable device to:
       recognize patterns contained in signals detected by the sensor, wherein the detected signals are to be analyzed without interpreting data payloads carried by the detected signals;
       generate a first fingerprint of a first set of wearable devices corresponding to the signals;

match the first fingerprint to a second fingerprint associated with a second set of wearable devices; and cloak the first fingerprint or the second fingerprint by simulating communications that appear to originate from a non-present device.

16. The system of claim 15, wherein a subset of the first set of wearable devices corresponds to a subset of the second set of wearable devices associated with the second fingerprint.

17. The system of claim 15, wherein the instructions, when executed, cause the programmable device to associate location data with the first fingerprint.

18. The system of claim 17, wherein the instructions, when executed, cause the programmable device to store the location data and the first fingerprint.

19. The system of claim 15, wherein the instructions, when executed, cause the programmable device to generate signals corresponding to devices not contained in the first set of wearable devices.

20. The system of claim 15, wherein the instructions, when executed, cause the programmable device to recognize patterns without interpreting data payloads contained in the signals.

* * * * *